United States Patent
Kim

(10) Patent No.: US 8,986,868 B2
(45) Date of Patent: Mar. 24, 2015

(54) RECHARGEABLE BATTERY

(75) Inventor: Jae-Hyung Kim, Yongin-si (KR)

(73) Assignee: Samsung SDI Co., Ltd., Yongin-si, Gyeonggi-do (KR)

(*) Notice: Subject to any disclaimer, the term of this patent is extended or adjusted under 35 U.S.C. 154(b) by 97 days.

(21) Appl. No.: 13/309,347

(22) Filed: Dec. 1, 2011

(65) Prior Publication Data
US 2012/0214036 A1 Aug. 23, 2012

(30) Foreign Application Priority Data
Feb. 22, 2011 (KR) .................. 10-2011-0015632

(51) Int. Cl.
| | |
|---|---|
| *H01M 4/00* | (2006.01) |
| *H01M 4/04* | (2006.01) |
| *H01M 2/26* | (2006.01) |
| *H01M 10/04* | (2006.01) |
| *H01M 4/02* | (2006.01) |

(52) U.S. Cl.
CPC .............. *H01M 4/0404* (2013.01); *H01M 2/26* (2013.01); *H01M 10/04* (2013.01); *H01M 2004/025* (2013.01)
USPC .............. 429/94; 429/152; 429/163; 429/209

(58) Field of Classification Search
CPC ..... H01M 2/26; H01M 4/0404; H01M 10/04; H01M 2004/025; Y02E 60/12
USPC .................... 429/94, 152, 163, 209
See application file for complete search history.

(56) References Cited

U.S. PATENT DOCUMENTS

| | | | |
|---|---|---|---|
| 8,276,695 B2 * | 10/2012 | Han et al. .................. 180/65.31 |
| 2002/0197535 A1 * | 12/2002 | Dudley et al. ................ 429/246 |
| 2005/0266150 A1 * | 12/2005 | Yong et al. ...................... 427/58 |
| 2009/0199394 A1 * | 8/2009 | Boczer et al. ................ 29/623.5 |

FOREIGN PATENT DOCUMENTS

| | | |
|---|---|---|
| JP | 2004-303622 A | 10/2004 |
| JP | 2006-147392 A | 6/2006 |
| KR | 10-2008-0037867 A | 5/2008 |
| WO | WO 02/101854 A2 | 12/2002 |

OTHER PUBLICATIONS

Korean Notice of Allowance dated Apr. 8, 2013 for Korean Patent Application No. KR 10-2011-0015632 which corresponds to captioned U.S. Appl. No. 13/309,347.

* cited by examiner

*Primary Examiner* — Gary Harris
(74) *Attorney, Agent, or Firm* — Knobbe Martens Olson & Bear LLP

(57) ABSTRACT

In one aspect, a rechargeable battery for efficiently controlling a composite thickness on both edges of a coated unit when an uncoated region on an edge of an electrode plate is used for an electrode assembly is provided. The rechargeable battery can include: an electrode assembly including electrodes with opposite polarities on both ends of a separator; and an electrode terminal connected to the electrode assembly wherein the electrode includes a coated unit coated with a composite on an electrode plate and an uncoated region set on an edge of the electrode plate exposed on the coated unit.

14 Claims, 8 Drawing Sheets

(a)

(b)

RECHARGEABLE BATTERY

CROSS-REFERENCE TO RELATED APPLICATIONS

This application claims priority to and the benefit of Korean Patent Application No. 10-2011-0015632 filed on Feb. 22, 2011 in the Korean Intellectual Property Office, the disclosure of which is incorporated herein in its entirety by reference.

BACKGROUND

1. Field

The described technology relates generally to a rechargeable battery for improving uniformity of composite thickness on an edge of a coated unit.

2. Description of the Related Technology

A rechargeable battery can repeatedly perform charge and discharge, unlike a primary battery. A nickel-hydrogen battery, a lithium battery, and a lithium ion battery are each a type of rechargeable battery. A rechargeable battery can be manufactured in a pack form for use in a portable electronic device such as a mobile phone, a laptop computer, and a camcorder.

In one example, a rechargeable battery can include a jelly-roll type of electrode assembly having a positive electrode and a negative electrode on both sides of a separator; a case having the electrode assembly; a cap plate for closing and sealing an opening of a case; and an electrode terminal protruded out of the cap plate and electrically connected to an uncoated region of the electrode assembly through a lead tab.

In another example, a rechargeable battery can include, where the rechargeable battery is large, a plurality of coated units having predetermined width and length formed on an electrode plate providing an edge of an electrode plate from pressing, the electrode plate can be slit to manufacture a jelly-roll type or stack type of electrode assembly. In this instance, the edge of the electrode plate can be trimmed to be eliminated through scrapping.

A process for manufacturing rechargeable battery can be adapted where the edge of the electrode plate of the rechargeable battery is not used for the electrode assembly. In such a process, a composite slurry including a solvent in a composite including an active material, a conductive agent, and a binder can be coated on the electrode plate and air can be blown thereon to thereby form a composite thickness on the edge of the coated unit that can be thinner than a composite thickness in the center thereof.

The edges of the coated unit can form a composite inclined unit having a difference between the two composite thicknesses. The composite inclined unit can be laminated with an organic tape to be processed as a non-reversible region, such a step can increase the production cost of the rechargeable battery.

Further, in the case of a large rechargeable battery, the edge of the electrode plate cannot be scrapped by trimming when it is pressed. Therefore, the composite thickness on the edge of the coated unit becomes greater than the composite thickness in the center.

When the composite slurry is coated on the rear side of the electrode plate the composite inclined unit having the maximum composite thickness in the coated unit can be supported by a transfer roll of the coater. This process can generate wrinkles in the electrode plate whereby, a fault is generated on the electrode plate.

The above information disclosed in this Background section is only for enhancement of understanding of the background of the described technology and therefore it may contain information that does not form the prior art that is already known in this country to a person of ordinary skill in the art.

SUMMARY

One aspect of this disclosure provides a rechargeable battery for efficiently controlling the composite thickness on both edges of a coated unit when an uncoated region on the edge of the electrode plate is used for an electrode assembly.

Another aspect of this disclosure provides a rechargeable battery for preventing generation of faults on the electrode plate caused by the composite thickness of the inclined unit on the edge of the coated unit.

Some embodiments provide a rechargeable battery including: an electrode assembly including electrodes with opposite polarities on both ends of a separator; a case for receiving the electrode assembly; and an electrode terminal connected to the electrode assembly and drawn outside of the case, wherein the electrode includes a coated unit having a composite on an electrode plate and an uncoated region set on an edge of the electrode plate exposed on the coated unit, wherein the coated unit can include a composite inclined unit that can be set by a thickness difference of the composites on an edge of the coated unit, a width of the composite inclined unit set in the width direction of the electrode plate is 10-50 mm, and in the composite inclined unit. In some embodiments, a maximum thickness of the composite can be 99-101% of the reference composite thickness set in the center of the electrode plate In some embodiments, the width of the composite inclined unit can be 30-40 mm.

In some embodiments, the reference composite thickness can be 200-220 μm, and a maximum thickness of the composite can be A to B in the composite inclined unit where A=reference composite thickness−2 μm and B=reference composite thickness+2 μm.

In some embodiments, the reference composite thickness can be 208 μm.

In some embodiments, the density of the composite inclined unit when the coated unit is pressed is 1.89-1.01 g/cc.

In some embodiments, the density of the composite inclined unit when the coated unit can be pressed can be 1.90 g/cc.

In some embodiments, the electrode assembly can be formed to be a jelly-roll type generated by providing electrodes with opposite polarities to both ends of the separator and winding the same.

In some embodiments, the electrode assembly can be formed to be a stack type generated by providing electrodes with opposite polarities to both ends of the separator and stacking the same.

According to an embodiment, the coated unit can be set to be 10-50 mm and the maximum thickness of the composite in the composite inclined unit can be set to be 99-101% of the reference composite thickness. In some embodiments, these parameters can prevent generation of faults on the electrode plate.

Some embodiments provide a rechargeable battery comprising an electrode assembly including electrodes with opposite polarities on both ends of a separator; and an electrode terminal connected to the electrode assembly, wherein the electrode includes a coated unit coated with a composite on an electrode plate and an uncoated region set on an edge of the electrode plate exposed on the coated unit, the coated unit includes a composite inclined unit that is set by a thickness difference of the composites on both edges, and a width of the composite inclined unit set in the width direction of the electrode plate is 10-50 mm. In some embodiments, a width of the composite inclined unit is 30-40 mm. In some embodiments, the reference composite thickness is 200-220 µm, and a maximum thickness of the composite is from about A to about B in the composite inclined unit where A=reference composite thickness−2 µm and B=reference composite thickness+2 µm. In some embodiments, the reference composite thickness is 208 µm. In some embodiments, a density of the composite inclined unit when the coated unit is pressed is 1.89-1.01 g/cc. In some embodiments, a density of the composite inclined unit when the coated unit is pressed is 1.90 g/cc. In some embodiments, the electrode assembly is formed to be a jelly-roll type generated by providing electrodes with opposite polarities to both ends of the separator and winding the same. In some embodiments, the electrode assembly is formed to be a stack type generated by providing electrodes with opposite polarities to both ends of the separator and stacking the same. In some embodiments, the rechargeable battery further comprises a case for receiving the electrode assembly, wherein the electrode terminal is drawn outside of the case. In some embodiments, a maximum thickness of the composite is 99-101% of the reference composite thickness set in a center of the electrode plate in the composite inclined unit. In some embodiments, the reference composite thickness is X, wherein X is in the range of from about 200 µm to about 220 µm. In some embodiments, the maximum thickness of the composite ranges from about $X+Y^1$ to about $X+Y^2$, wherein $Y^1$ is −2 µm; and $Y^2$ is +2 µm. In some embodiments, a density of the composite inclined unit when the coated unit is pressed is from about 1.89-1.01 g/cc. In some embodiments, a density of the composite inclined unit when the coated unit is pressed is 1.90 g/cc. In some embodiments, the electrode assembly is formed to be a jelly-roll type generated by providing electrodes with opposite polarities to both ends of the separator and winding the same. In some embodiments, the electrode assembly is formed to be a stack type generated by providing electrodes with opposite polarities to both ends of the separator and stacking the same. In some embodiments, a width of the composite inclined unit is 30-40 mm. In some embodiments, the reference composite thickness is X, wherein X is 208 µm.

DETAILED DESCRIPTION

Figure 1:
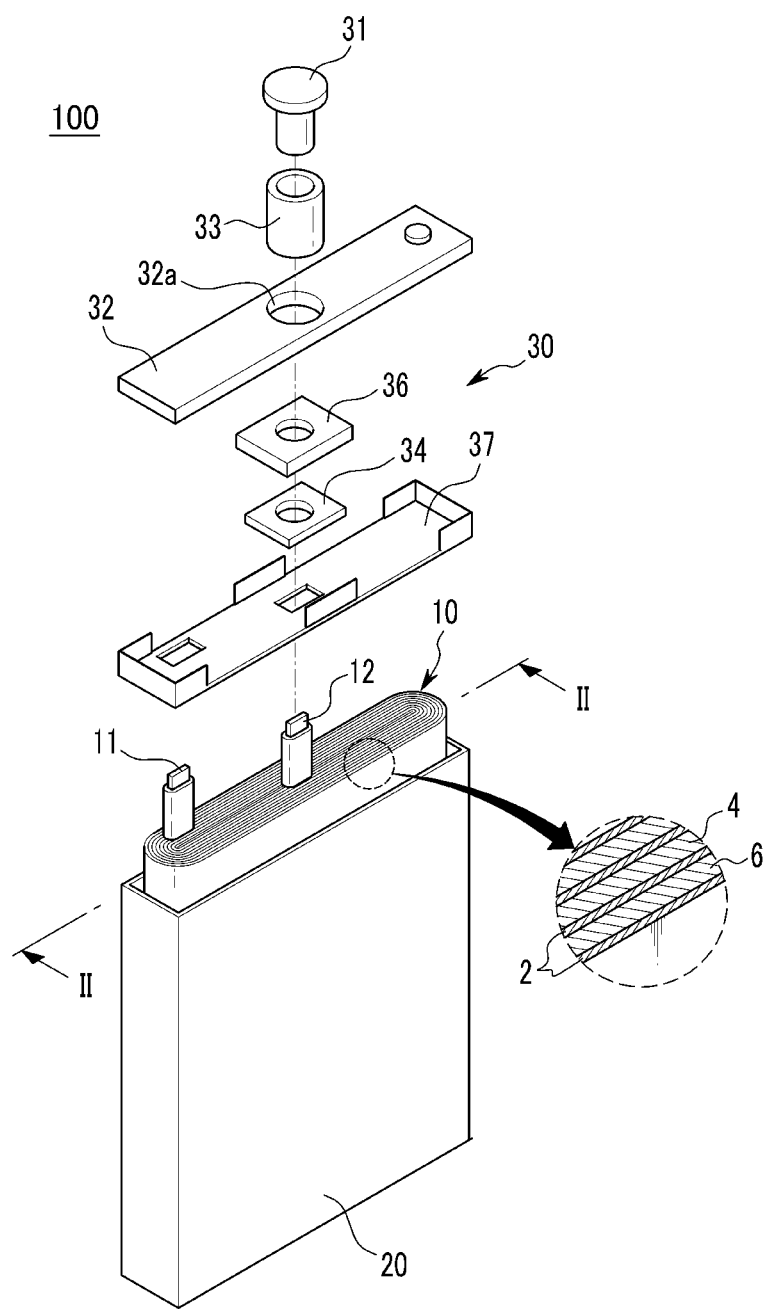
FIG. 1 shows an exploded perspective view of a rechargeable battery according to a first embodiment.

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. Like reference numerals designate like elements throughout the specification.

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Since the disclosure may be modified in various ways and have various embodiments, the disclosure will be described in detail with reference to the drawings. However, it should be understood that the disclosure is not limited to a specific embodiment but includes all changes and equivalent arrangements and substitutions included in the spirit and scope of the disclosure.

Figure 2:
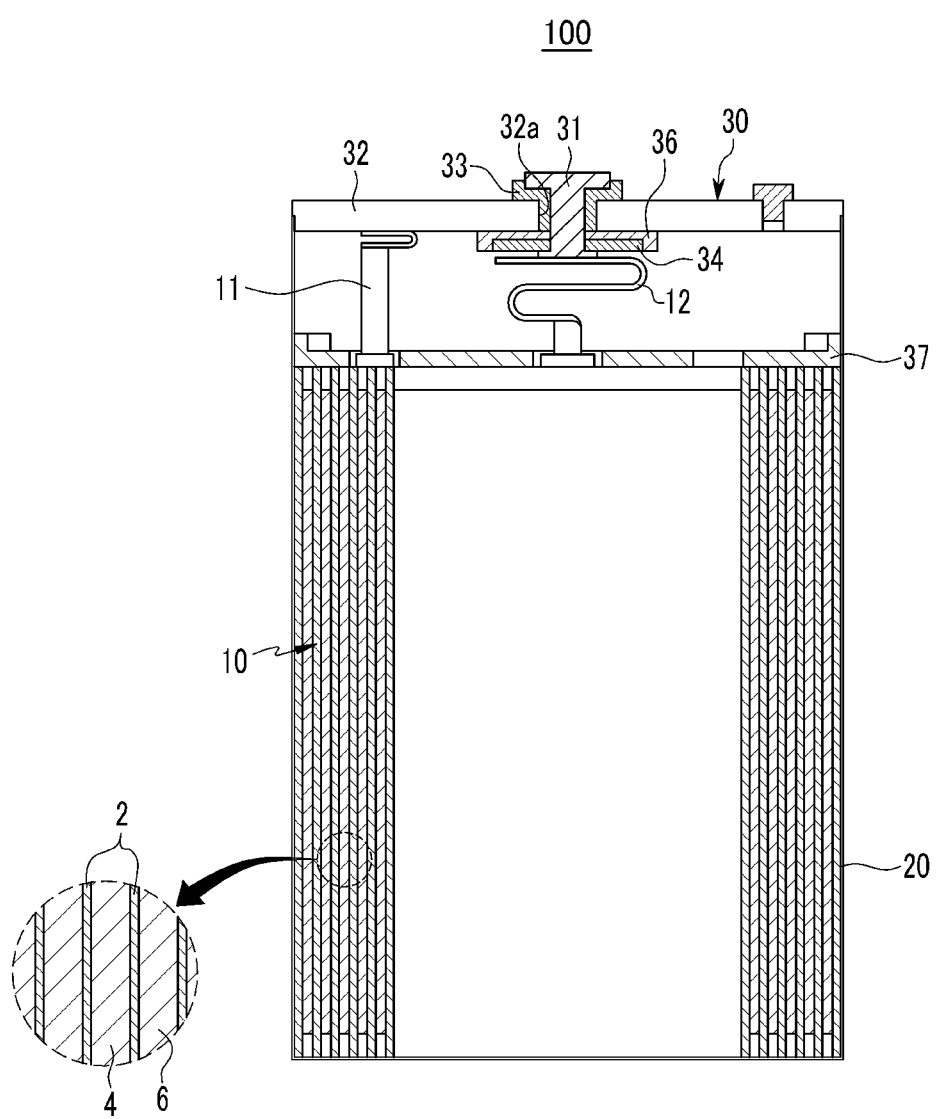
FIG. 2 shows a cross-sectional view with respect to a line II-II of FIG. 1.

FIG. 1 shows an exploded perspective view of a rechargeable battery 100 according to a first embodiment, and FIG. 2 shows a cross-sectional view with respect to a line II-II of FIG. 1. Referring to FIG. 1 and FIG. 2, the rechargeable battery 100 includes an electrode assembly 10, a case 20 for receiving the electrode assembly 10 together with an electrolyte solution, and a cap assembly 30 for sealing an opening formed on the top of the case 20.

The electrode assembly 10 can be formed by stacking a positive electrode 4 and a negative electrode 6 and spiral-winding the same in a jelly-roll form with a separator 2 therebetween. The positive electrode 4 and the negative electrode 6 are connected to lead tabs 11 and 12 respectively in the electrode assembly 10.

The case 20 allows insertion of the electrode assembly 10 through an opening formed on one side, and it can be formed with a conductor so as to function as an electrode terminal. For example, the case 20 can be connected to the lead tab 11 to function as a positive electrode terminal. In this instance, the electrode terminal 31 installed in the cap assembly 30 can be connected to the lead tab 12 to function as a negative electrode terminal. On the contrary, the case can function as a negative electrode terminal and the electrode terminal can function as a positive electrode terminal (not shown).

In some embodiments, the cap assembly 30 (refer to FIG. 2) can be bonded to the opening of the case 20 (refer to FIG. 1) to close and seal the opening. As an example, the cap assembly 30 can include a cap plate 32 fixed to the opening of the case 20, an electrode terminal 31 inserted into a terminal hole 32a of the cap plate 32 by providing an insulating gasket 33, a terminal plate 34 electrically connected to the bottom of the electrode terminal 31, an insulating plate 36 provided between the cap plate 32 and the terminal plate 34, and an insulating case 37 installed between the electrode assembly 10 and the cap assembly 30 to insulate the electrode assembly 10 and the cap assembly 30. The insulating gasket 33 electrically insulates the electrode terminal 31 and the cap plate 32, and the insulating plate 36 electrically insulates the terminal plate 34 and the cap plate 32.

In some embodiments, the lead tab 11 connected to the positive electrode 4 can be welded inside the cap plate 32 so that the cap plate 32 and the case 20 may function as positive electrode terminals. In some embodiments, the lead tab 12 connected to the negative electrode 6 can be welded on the bottom side of the terminal plate 34 or the bottom of the electrode terminal 31 so that the electrode terminal 31 may function as a negative electrode terminal.

Figure 3:
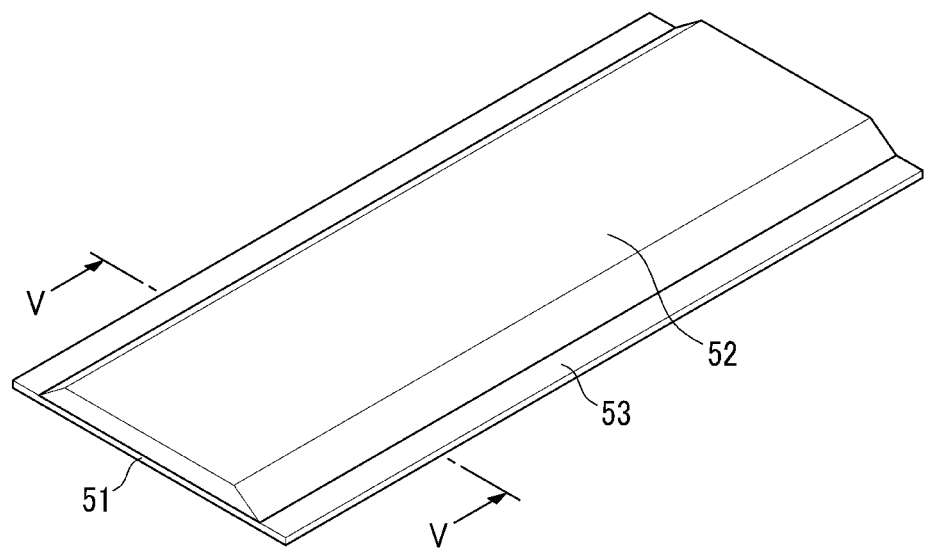
FIG. 3 shows a perspective view of an electrode plate having undergone a coating and pressing process applicable to a rechargeable battery according to a first embodiment.
Figure 4:
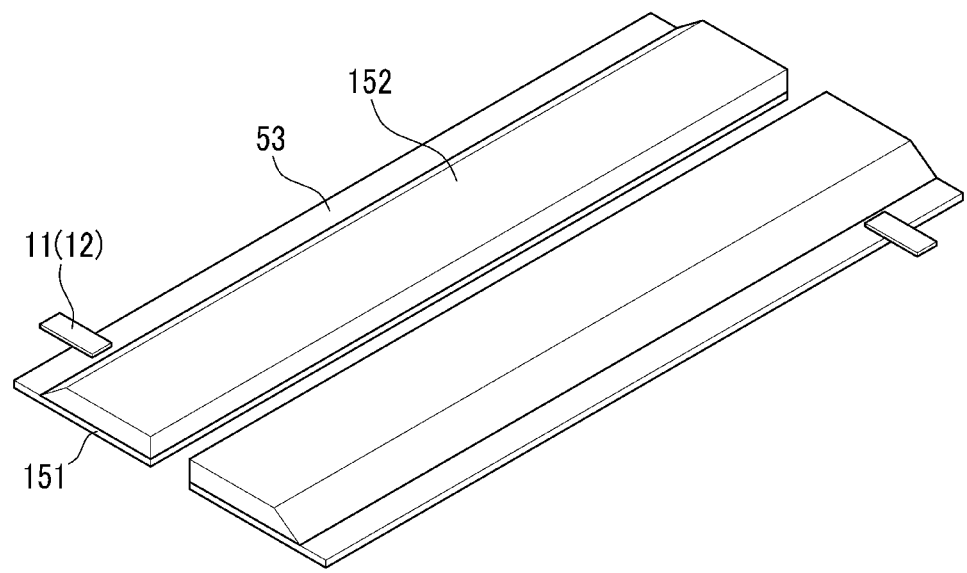
FIG. 4 shows a perspective view of an electrode plate of FIG. 3 that is cut in a length direction.

FIG. 3 shows a perspective view of an electrode plate 51 having undergone a coating and pressing process applicable to a rechargeable battery 100 according to a first embodiment, and FIG. 4 shows a perspective view of an electrode plate 51 of FIG. 3 that is cut in a length direction. For ease of description, the positive electrode 4, the negative electrode 6, and the electrode plate 51 will be referred to as electrode plates 51 during the manufacturing process, and they will be called the positive electrode 4 and the negative electrode 6 when they are assembled to the electrode assembly 10 or the rechargeable battery 100.

In some embodiments, the positive electrode 4 and the negative electrode 6 of FIG. 1 and FIG. 2 can be configured as a structure in which coated units 52 and 152 are formed on the electrode plates 51 and 151 functioning as a current collector, as shown in FIG. 3 and FIG. 4. The positive electrode 4 and the negative electrode 6 are determined by the material of the electrode plates 51 and 151 and the composite for forming the coated units 52 and 152.

In some embodiments, the composite can be configured by including a binder in the active material and the conductive agent, and it can be coated in the state of the composite slurry including the solvent on the electrode plate 51. In some embodiments, the coated composite can pass through the press process to be formed to be coated unit 52 on the electrode plate 51 (refer to FIG. 3). Also, the electrode plate 51 can include an uncoated region 53 that can be exposed from the coated unit 52 on both edges in the width direction.

Referring to FIG. 4, the electrode plate 151 including the coated unit 152 can be cut in the length direction from the center of the width direction to be used as the positive electrode 4 or the negative electrode 6. In some embodiments, the electrode plate 151 can include an uncoated region 53 that can be set on an edge in the width direction, and the uncoated region 53 can be connected to the lead tabs 11 and 12.

In some embodiments, the positive electrode 4 and the negative electrode 6 formed can be disposed and spiral-wound on both sides of the separator 2, thereby forming the electrode assembly 10 shown in FIG. 1 and FIG. 2. Thus, forming the electrode plate 151 having the coated unit 152 and the uncoated region 53 shown in FIG. 4.

Figure 5:
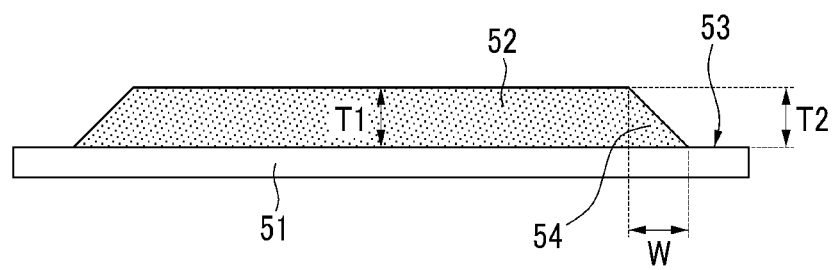
FIG. 5 shows a cross-sectional view of an electrode plate shown in FIG. 3 with respect to a line V-V.

FIG. 5 shows a cross-sectional view along line V-V from FIG. 3 of an electrode plate 51. Referring to FIG. 5, the electrode plate 51 includes a coated unit 52 relative to the composite and uncoated regions 53 set on both edges of the electrode plate 51. In FIG. 4, the electrode plate 151 has an uncoated region 53 relative to the coated unit 152.

Referring to FIG. 5, the coated unit 52 has a composite thickness within the allowable range in the width direction of the electrode plate 51, and includes a composite inclined unit 54 that can be set by the thickness difference of the composites on both ends of the edge. Thus, a reference composite thickness T1 can be set in the center in the width direction of the coated unit 52, and a maximum thickness T2 of the composite can be set in the composite inclined unit 54. In some embodiments, the maximum thickness T2 of the composite can be greater or less than the reference composite thickness T1 depending on the shape of the composite inclined unit 54. For example, the reference composite thickness T1 can be set to be 200-220 μm.

Figure 6:
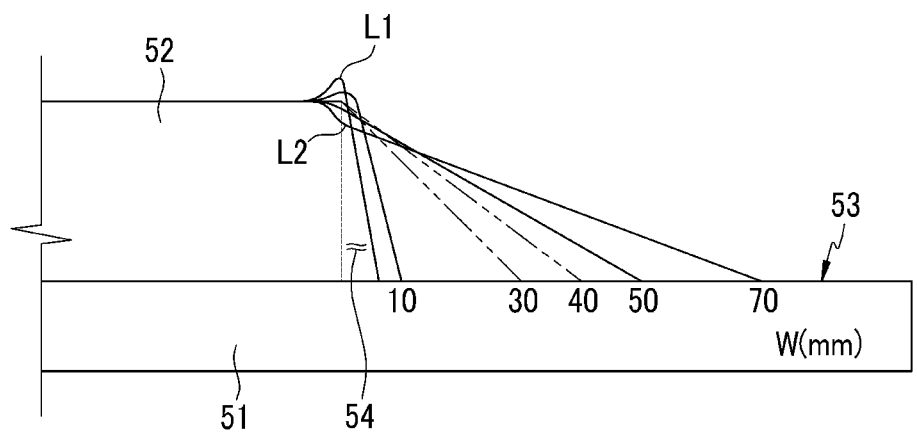
FIG. 6 shows a magnified cross-sectional view of a composite inclined unit on an edge of a coated unit.

FIG. 6 shows a magnified cross-sectional view of a composite inclined unit 54 on an edge of a coated unit. Referring to FIG. 6, in order to prevent faults of the electrode plate 51 caused by the maximum thickness T2 of the composite, the width (W) of the composite inclined unit 54 can be set to be 10-50 mm, and the maximum thickness T2 of the composite can be set to be 99-101% of the reference composite thickness T1.

A reason for setting the width (W) of the composite inclined unit 54 (shown in FIG. 5) to be 10-50 mm as described herein.

When the width (W) (shown in FIG. 5) of the composite inclined unit 54 (shown in FIG. 5) is less than 10 mm, the maximum thickness T2 (shown in FIG. 5) of the composite of the composite inclined unit 54 (shown in FIG. 5) becomes excessively greater than the reference composite thickness T1 (shown in FIG. 5) to form a high edge L1 (shown in FIG. 6) in the composite inclined unit 54 (shown in FIG. 6). In some embodiments, the high edge L1 (shown in FIG. 6) of the composite inclined unit 54 (shown in FIG. 6) can excessively increase the composite density when the coated unit 52 (shown in FIG. 6) is pressed.

Also, when the width (W) (shown in FIG. 6) of the composite inclined unit 54 (shown in FIG. 6) is less than 10 mm, the elongation rate of the composite inclined unit 54 (shown in FIG. 6) and the electrode plate 51 can be steeply changed so wrinkles are generated on a boundary of the composite inclined unit 54 (shown in FIG. 6) and the uncoated region 53 (shown in FIG. 6). The coated unit 52 (shown in FIG. 6) cannot be formed on both sides of the electrode plate 51 (shown in FIG. 6) because of the fault of the electrode plate.

When the width (W) (shown in FIG. 5) of the composite inclined unit 54 (shown in FIG. 5) can be greater than 50 mm, the maximum thickness T2 (shown in FIG. 5) of the composite in the composite inclined unit 54 (shown in FIG. 5) can become excessively less than the reference composite thickness T1 (shown in FIG. 5) to form a low edge L2 (shown in FIG. 5) in the composite inclined unit 54 (shown in FIG. 5). The low edge L2 (shown in FIG. 6) of the composite inclined unit 54 (shown in FIG. 6) discards the composite because of reduction of the composite thickness and deterioration of adhesiveness with the electrode plate 51 (shown in FIG. 6). Therefore, since the bottom value of the composite is reduced in the coated unit 52 (shown in FIG. 6), the capacity of the rechargeable battery 100 is deteriorated.

Further, the low edge L2 (shown in FIG. 6) of the composite inclined unit 54 (shown in FIG. 6) substantially reduces the composite density when the coated unit 52 (shown in FIG. 6) is pressed. Therefore, a pore area between the positive electrode 4 (shown in FIG. 1) and the separator 2 (shown in FIG. 1) and between the negative electrode 6 (shown in FIG. 1) and the separator 2 (shown in FIG. 1) is increased so an uncharged and non-discharged area is increased. Cell stability is deteriorated because of lithium dendrite growth when charged. That is, fluent charge and discharge by the rechargeable battery 100 becomes difficult.

A reason for setting the maximum thickness T2 (shown in FIG. 5) of the composite to be 99-101% of the reference composite thickness T1 (shown in FIG. 5) as described herein.

When the maximum thickness T2 (shown in FIG. 5) of the composite is greater than 101% of the reference composite thickness T1 (shown in FIG. 5), the composite inclined unit 54 (shown in FIG. 6) forms a high edge L1 (shown in FIG. 6) signifying that the maximum thickness T2 (shown in FIG. 6) of the composite is greater than the reference composite thickness T1 (shown in FIG. 6). The problems caused by the high edge occur in a like manner of the case in which the width (W) of the composite inclined unit 54 (shown in FIG. 6) is less than 10 mm.

When the maximum thickness T2 (shown in FIG. 5) of the composite is less than 99% of the reference composite thickness T1 (shown in FIG. 5), the composite inclined unit 54 (shown in FIG. 5) forms a low edge L2 (shown in FIG. 6) signifying that the maximum thickness T2 (shown in FIG. 5) of the composite is less than the reference composite thickness T1 (shown in FIG. 5). The problems caused by the low edge occur in a like manner of the case in which the width (W) (shown in FIG. 5) of the composite inclined unit 54 (shown in FIG. 5) is greater than 50 mm.

Figure 7:
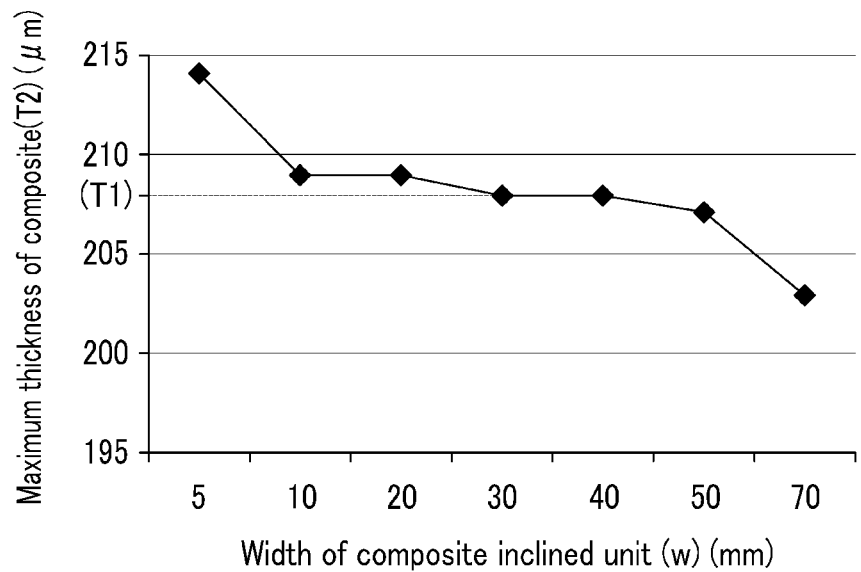
FIG. 7 shows a graph of a composite thickness on an edge of a coated unit according to width of a composite inclined unit.

FIG. 7 shows a graph of a composite thickness on an edge of a coated unit 52 (shown in FIG. 6) according to width of a composite inclined unit 54 (shown in FIG. 6). FIG. 7 shows a relationship between the width (W) (shown in FIG. 6) that is set by measuring the composite inclined unit 54 (shown in FIG. 6) on the manufactured electrode plate 51 (shown in FIG. 6) and the maximum thickness T2 (shown in FIG. 6) of the composite.

Referring to FIG. 7, when the reference composite thickness T1 (shown in FIG. 6) is 208 μm (±2) thick and the widths (W) (shown in FIG. 6) of the composite inclined unit 54 (shown in FIG. 6) are 10, 20, 30, 40, and 50 mm, respectively, the maximum thicknesses T2 (shown in FIG. 6) of the composite are 209, 209, 208, 208, and 207 μm, respectively. In some embodiments, the widths (W) of the composite unit 54 can be in the range of from about 10 mm to about 50 mm. In some embodiments, the maximum thicknesses T2 of the composite unit 54 can be in the range of from about 200 μm to about 220 μm.

Compared to this, when the width (W) of the composite inclined unit 54 is 5 mm that is less than 10 mm, the maximum thickness T2 of the composite is 214 μm. That is, the composite inclined unit 54 forms a high edge (L1 of FIG. 6). When the width (W) of the composite inclined unit 54 is 70 mm that is greater than 50 mm, the maximum thickness T2 of the composite is 203 μm. That is, the composite inclined unit 54 forms a low edge (L2 of FIG. 6).

Figure 8:
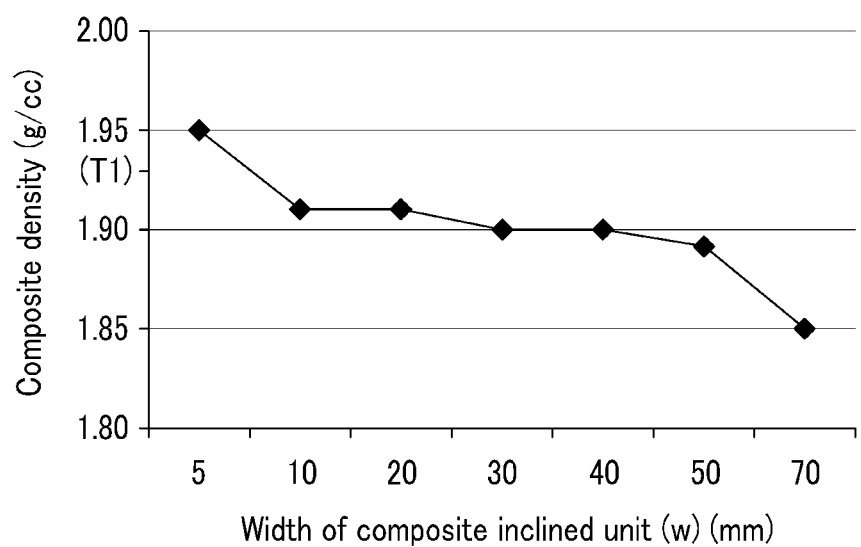
FIG. 8 shows a graph of a composite density on an edge of a coated unit according to width of a composite inclined unit.

FIG. 8 shows a graph of a composite density on an edge of a coated unit 52 (shown in FIG. 6) according to width of a composite inclined unit 54 (shown in FIG. 6). FIG. 8 shows a relationship between the width (W) and the composite density by pressing the electrode plate 51 manufactured with reference to FIG. 7.

Referring to FIG. 8, when the reference composite density is 1.90 g/cc (±1) and the widths (W) (shown in FIG. 6) of the composite inclined unit 54 (shown in FIG. 6) are 10, 20, 30, 40, and 50 mm, respectively, the densities of the composite are 1.91, 1.91, 1.90, 1.90, and 1.89 g/cc. That is, the composite densities are 101, 101, 100, 100, and 99% compared to the reference composite density of 1.90 g/cc. In some embodiments, the densities of the composite unit 54 can be in the range of from about 1.89 g/cc to about 1.01 g/cc.

Compared to this, when the width (W) of the composite inclined unit 54 is 5 mm that is less than 10 mm, the density of the composite is 1.95 g/cc. That is, the density of the composite is 103% compared to the reference composite density of 1.90 g/cc to excessively form the high density.

When the width (W) of the composite inclined unit 54 is 70 mm that is greater than 50 mm, the density of the composite is 10.85 g/cc. That is, the composite inclined unit 54 substantially forms the low density of 97% compared to the reference composite density of 1.90 g/cc.

Referring to FIG. 7 and FIG. 8, when the width (W) (shown in FIG. 5) of the composite inclined unit 54 (shown in FIG. 5) is 30-40 mm, the maximum thickness T2 (shown in FIG. 5) of the composite is 208 μm that is the same as the reference composite thickness T1 (shown in FIG. 5), and the composite density is 1.90 g/cc that is the same as the reference composite density.

Figure 9:
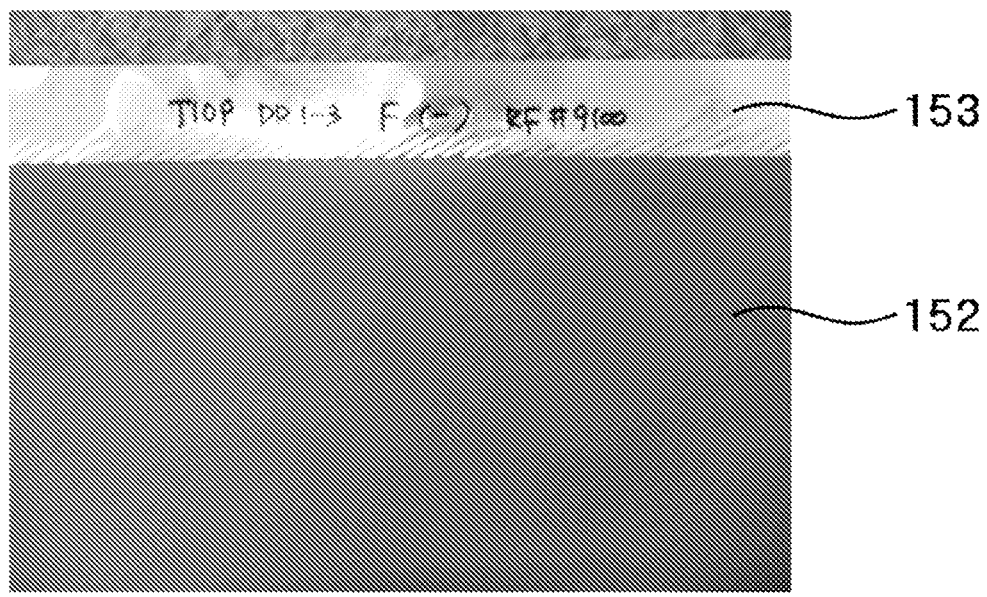
FIG. 9 shows (a) an edge of a coated unit of an electrode plate having wrinkles (b) an edge of a coated unit of an electrode plate having no wrinkles.
Figure 9:
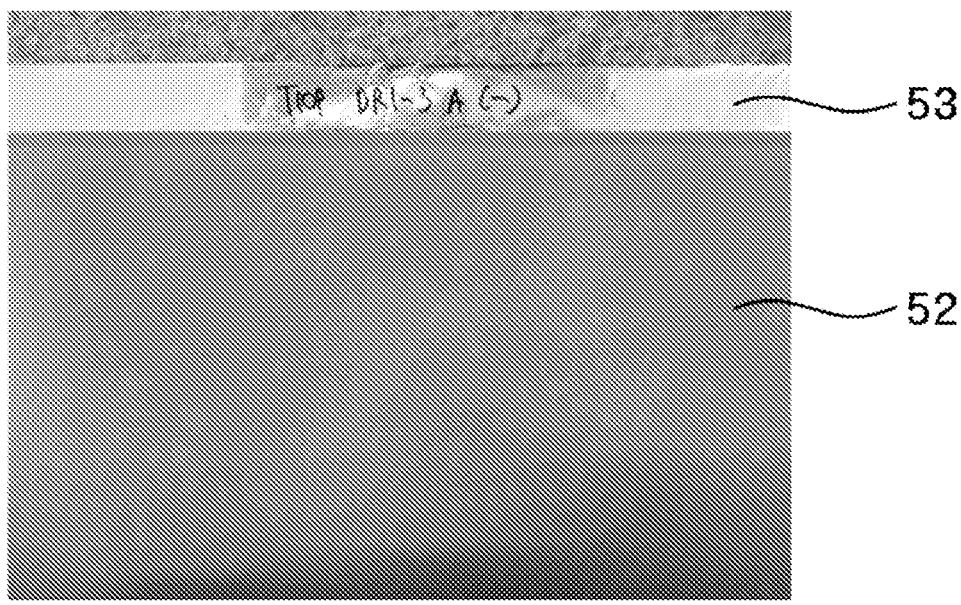

FIG. 9 shows (a) an edge of a coated unit of an electrode plate having wrinkles in which wrinkles are generated on an edge of a coated unit of an electrode plate; and (b) an edge of a coated unit of an electrode plate having no wrinkles. Referring to FIG. 9 (a), when the width (W) (shown in FIG. 5) of the composite inclined unit is 5 mm, the elongation rate of the composite inclined unit and the electrode plate is steeply changed to generate a wrinkle on the boundary of the composite inclined unit of the coated unit 152 (shown in FIG. 9) and the uncoated region 153 (shown in FIG. 9). Compared to this, referring to FIG. 9 (b), when the width (W) (shown in FIG. 5) of the composite inclined unit 54 (shown in FIG. 5) is 50 mm, no wrinkle occurs on the boundary of the composite inclined unit 54 (shown in FIG. 9) and the uncoated region 53 (shown in FIG. 9). In a typical embodiment, the widths (W) of the composite unit 54 can be in the range of from about 10 mm to about 50 mm.

A second embodiment will be described in comparison with the first embodiment. The same components as in the first embodiment will not be described.

The positive electrode 4 (shown in FIG. 1) and the negative electrode 6 (shown in FIG. 1) formed to be the electrode plate 151 (shown in FIG. 4) according to the first embodiment can be spiral-wound with a separator 2 (shown in FIG. 1) therebetween to form a jelly-roll type of electrode assembly 10 (shown in FIG. 1).

Figure 10:
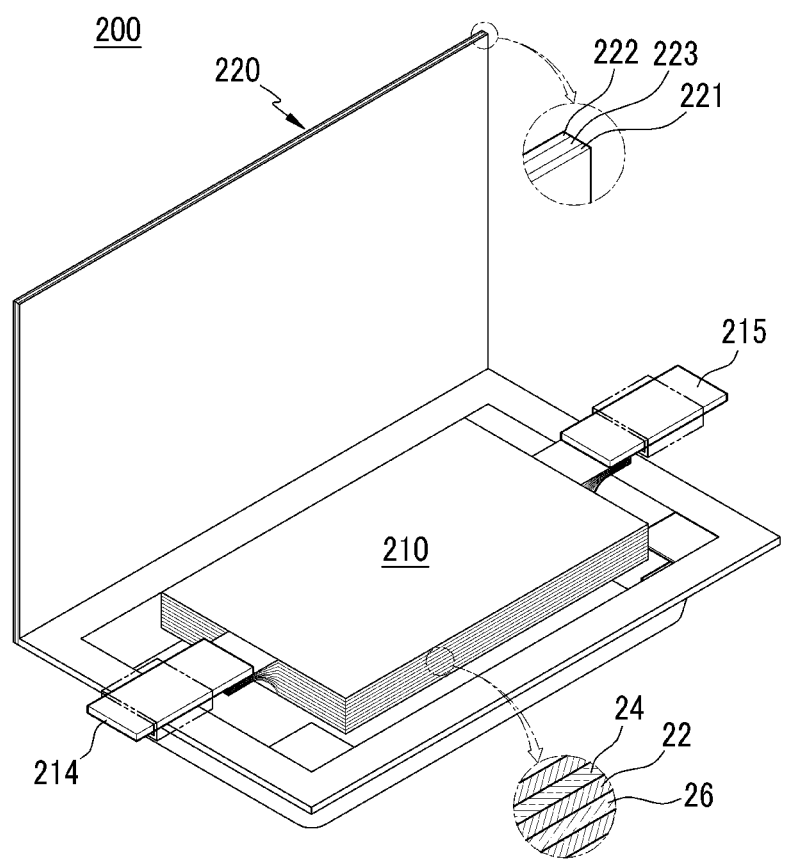
FIG. 10 shows an exploded perspective view of a rechargeable battery according to a second embodiment.
Figure 11:
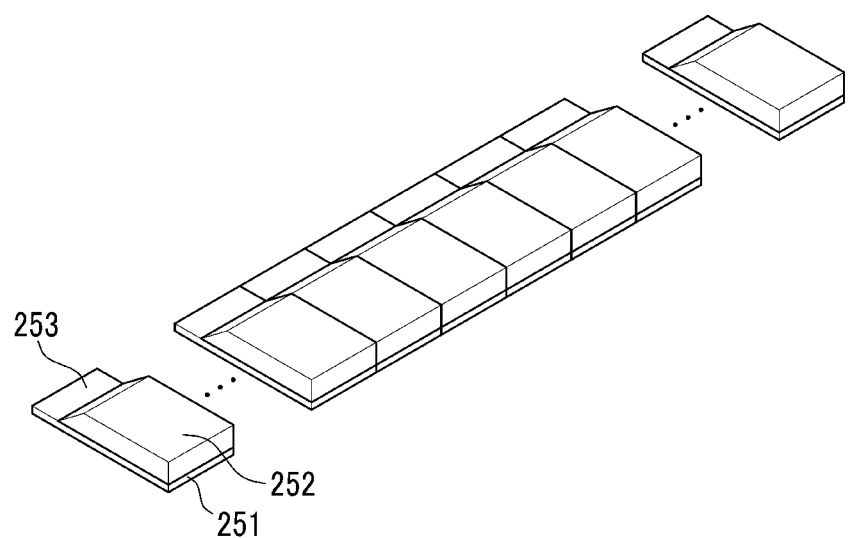
FIG. 11 shows a perspective view of an electrode plate of FIG. 4 that is cut with respect to a width direction. The electrode plate can be applied to a rechargeable battery according to a second embodiment.

FIG. 10 shows an exploded perspective view of a rechargeable battery 200 according to a second embodiment of the present invention, and FIG. 11 shows a perspective view of an electrode plate 151 of FIG. 4 that is cut with respect to a width direction so as to be applied to a rechargeable battery 200 according to a second embodiment.

Referring to FIG. 11, the electrode plate 251 is cut in the width direction with an interval that is set in the length direction of the electrode plate 151 shown in FIG. 4. In some embodiment, the electrode plate 251 can be used as the positive electrode 24 (shown in FIG. 10) and the negative electrode 26 (shown in FIG. 10). The positive electrode 24 (shown in FIG. 10) and the negative electrode 26 (shown in FIG. 10) formed with the electrode plate 251 includes a coated unit 252 and an uncoated region 253, and also includes a composite inclined unit configured in a like manner of the first embodiment (refer to FIGS. 6, 7, and 8).

Compared to the first embodiment, the positive electrode 24 (shown in FIG. 10) and the negative electrode 26 (shown in FIG. 10) formed with the electrode plate 251 according to the second embodiment forms a stack type electrode assembly 210 with a separator 22 (shown in FIG. 10) therebetween. The second embodiment can be applicable to the stack type electrode assembly 210.

In some embodiments, the case 220 can be formed as a pouch type with a multi-layered sheet structure surrounding the electrode assembly 210. The pouch can be made with known materials. In some embodiments, the lead tabs 214 and 215 connected to the positive electrode 24 and the negative electrode 26 can be connected to the opposite sides of the electrode assembly 210, and are drawn, while insulated, to be outside the case 220.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A rechargeable battery comprising:
   an electrode assembly including electrodes with opposite polarities on both ends of a separator; and
   an electrode terminal connected to the electrode assembly, wherein
   each electrode includes
      a coated unit coated with a composite on an electrode plate and
      an uncoated region set on an edge of the electrode plate exposed on the coated unit,
      the coated unit includes a composite inclined unit that is set by a thickness difference of the composites on an edge of the coated unit, and
      a width of the composite inclined unit set in the width direction of the electrode plate is 10-50 mm,
      wherein a maximum thickness of the composite is 99-101% of a reference composite thickness set in a center of the electrode plate in a width direction of the coated unit and wherein the uncoated region directly abuts the composite inclined unit, and wherein a density of the composite inclined unit is 1.89 g/cc, 1.90 g/cc, or 1.91 g/cc.

2. The rechargeable battery of claim 1, wherein a width of the composite inclined unit is 30-40 mm.

3. The rechargeable battery of claim 1, wherein a reference composite thickness is 200-220 µm, and a maximum thickness of the composite is A to B in the composite inclined unit where
   A=reference composite thickness−2 µm and
   B=reference composite thickness+2 µm.

4. The rechargeable battery of claim 3, wherein the reference composite thickness is 208 µm.

5. The rechargeable battery of claim 1, wherein a density of the composite inclined unit is 1.90 g/cc.

6. The rechargeable battery of claim 1, wherein the electrode assembly is formed to be a jelly-roll generated by providing electrodes with opposite polarities to both ends of the separator and winding the same.

7. The rechargeable battery of claim 1, wherein the electrode assembly is formed to be a stack generated by providing electrodes with opposite polarities to both ends of the separator and stacking the same.

8. The rechargeable battery of claim 1, further comprising a case for receiving the electrode assembly, wherein the electrode terminal is drawn outside of the case.

9. The rechargeable battery of claim 1, wherein the reference composite thickness is X, wherein X is in the range of from about 200 µm to about 220 µm, and wherein the width of the composite inclined unit is 30-40 mm.

10. The rechargeable battery of claim 9, wherein the maximum thickness of the composite ranges from about $X+Y^1$ to about $X+Y^2$, wherein $Y^1$ is −2 µm; and $Y^2$ is +2 µm.

11. The rechargeable battery of claim 10, wherein a density of the composite inclined unit is 1.90 g/cc and wherein a width of the composite inclined unit is 30-40 mm.

12. The rechargeable battery of claim 10, wherein the electrode assembly is formed to be a jelly-roll generated by providing electrodes with opposite polarities to both ends of the separator and winding the same.

13. The rechargeable battery of claim 10, wherein the electrode assembly is formed to be a stack generated by providing electrodes with opposite polarities to both ends of the separator and stacking the same.

14. The rechargeable battery of claim 11, wherein the reference composite thickness is X, wherein X is 208 µm.

* * * * *